United States Patent
Hicks et al.

[19]

[11] Patent Number: 5,867,255
[45] Date of Patent: Feb. 2, 1999

[54] FILM DRIVE ASSEMBLY

[76] Inventors: Ray Hicks, 10261 Carmer Rd., Fenton, Mich. 48430; Jerald M. Mathis, 2306 Morrish Rd., Schwartz, Mich. 48473

[21] Appl. No.: 784,340

[22] Filed: Jan. 16, 1997

[51] Int. Cl.[6] .................................................. G03B 27/62
[52] U.S. Cl. ............................................................. 355/75
[58] Field of Search ................................ 355/55, 41, 71, 355/75, 50, 54, 56; 352/51, 52

[56] References Cited

U.S. PATENT DOCUMENTS

| | | | |
|---|---|---|---|
| 3,511,565 | 5/1970 | Harman, Jr. et al. | 355/75 |
| 4,576,471 | 3/1986 | Kogane et al. | 355/50 |
| 4,660,091 | 4/1987 | Nutting | 355/68 |
| 4,908,657 | 3/1990 | Kogane | 355/75 |
| 4,951,086 | 8/1990 | Hicks | 355/41 |
| 5,097,292 | 3/1992 | Hicks | 355/75 |
| 5,099,275 | 3/1992 | Hicks | 355/55 |
| 5,130,746 | 7/1992 | Hicks | 355/71 |
| 5,146,266 | 9/1992 | Hicks | 355/50 |
| 5,257,066 | 10/1993 | Hicks | 355/75 |
| 5,343,272 | 8/1994 | Hicks | 355/75 |
| 5,617,184 | 4/1997 | Kuwayama et al. | 355/75 |

*Primary Examiner*—D. Rutledge
*Attorney, Agent, or Firm*—Young & Basile, P.C.

[57] ABSTRACT

A film drive mechanism for positioning film relative to an aperture in a riser block of a photographic printer. The mechanism provides the usual ability to adjust each frame of film in the X axis paralleling the direction of film movement, adjust each frame in the Y axis transverse to the direction of film movement, crop each frame by selectively varying the size and configuration of the riser block aperture, and selectively move each frame between portrait and landscape formats. Additionally, a mechanism is provided to rotate each frame of film relative to the aperture in the riser block so as to correct for exposures made with cameras that are not level.

10 Claims, 4 Drawing Sheets

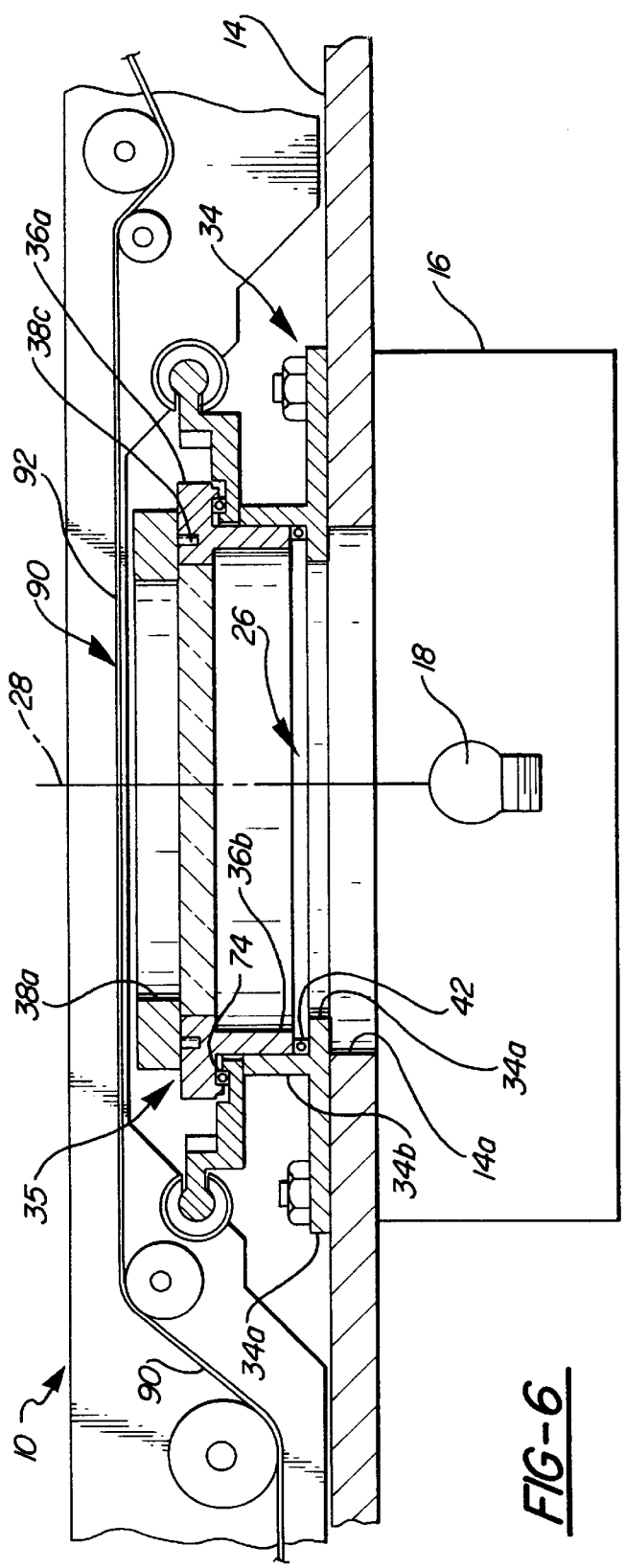
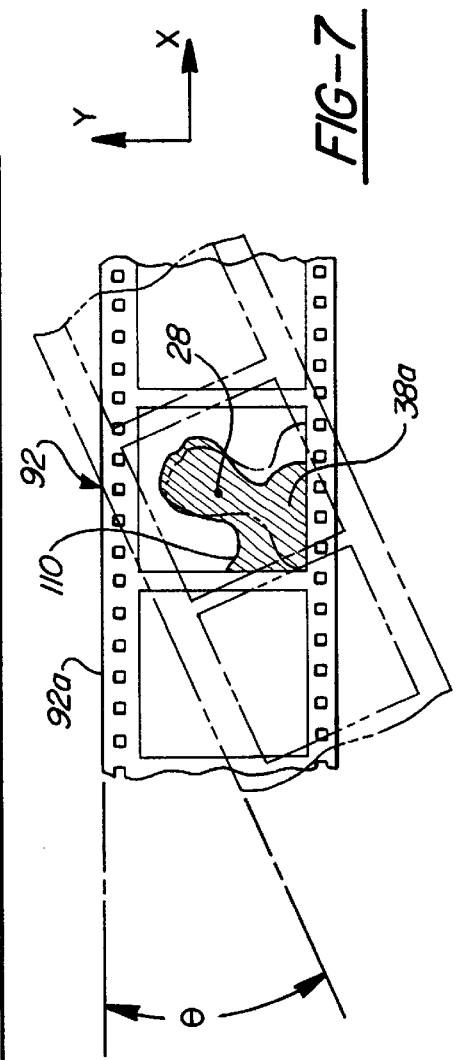
FIG-6
FIG-7

FILM DRIVE ASSEMBLY

BACKGROUND OF THE INVENTION

This invention relates to film drive assemblies for photographic printers.

Commercial photographic processing laboratories require the capability of making vast numbers of photographic prints from equally large numbers of photographic negatives. The photographic negatives are typically handled in long roll form and are processed in photographic printers by mounting the long roll of negative film on mechanized film drives. The photographic printers may operate in both automated or semi-automated environments.

Most film drives for use with these photographic printers are either electrically or pneumatically powered. A continuous roll of exposed and developed photographic film is mounted on the feed spool of the film drive and routed across the optical stage of the photographic printer. Individual negative frames are sequentially positioned at the optical stage of the photographic printer by operation of the drive components of the film drive so that one or more photographic prints can be made from each frame under either operator or machine control. Finally, the film is collected on a film take-up spool of the film drive.

Because photographic film is manufactured in a variety of different widths, a film drive needs to be capable of variably laterally positioning the film in relation to the photographic printer so that the longitudinal center line of the various widths of photographic film can be positioned to correspond with the optical center of the photographic printer. And because each frame of a roll of photographic film requires individual cropping, a film drive further must be capable of variably positioning each frame of a roll of film of a given width in a longitudinal sense. The film drive also desirably provides the ability to expose the individual film frames in either a landscape format or a portrait format.

Various film drives are available that satisfactorily perform all of the above-described functions. See, for example, the film drives disclosed in applicant's U.S. Pat. Nos. 5,343,272, 5,146,266 and 5,097,292.

However, there still exists a need to adjust the film as it is being processed in a manner to compensate for exposures that are unwantedly tilted with respect to horizontal or vertical references.

SUMMARY OF THE INVENTION

This invention is directed to the provision of an improved film drive assembly.

More specifically, this invention is directed to the provision of a film drive assembly that provides selective positioning of each frame of film relative to the optical stage of the associated printer including positioning in a manner to compensate for unwanted tilting of the exposure.

The invention film drive assembly is intended for use with photographic equipment of the type including an optical stage defining an optical center line and includes a base defining a central aperture adapted to be positioned proximate the optical stage, a table assembly mounted on the base for rotary movement about the optical center line and including an aperture, and a film transport mechanism movable with the table assembly and defining a longitudinal film path passing over the table aperture whereby the film transport mechanism may be rotated with the table assembly about the optical center line between portrait and landscape formats.

According to the invention, the film drive assembly further includes rotation means mounting the film transport mechanism for rotary movement relative to the table assembly about the optical center line. With this arrangement, the film transport mechanism may be rotated relative to the table assembly aperture to rotate the film relative to the table assembly aperture and compensate for unwanted tilting of the exposure.

According to a further feature of the invention, the rotation means comprises a ring mount member having a central ring portion positioned concentric to the optical center line and parallel rails at opposite sides of the central ring portion, and the film transport mechanism is mounted on the rails for movement in a direction transverse to the longitudinal film path. With this arrangement, adjustment of the film relative to the aperture in an X direction may be achieved by selectively moving the film along the longitudinal film path, adjustment in the Y direction may be achieved by moving the film transport mechanism transversely on the rails, and rotary adjustment of the film relative to the aperture may be achieved by rotary movement of the film transport mechanism about the optical center line.

According to a further feature of the invention, first rotation means mount the ring mount member and the table assembly for joint rotary movement about the optical center line to allow joint movement of the film transport mechanism and the table assembly between portrait and landscape formats, and second rotation means mount the ring mount member for rotary movement relative to the table assembly about the optical center line to allow rotation of the film relative to the table assembly aperture.

According to a further feature of the invention, the first rotation means comprises first bearing means mounting the table assembly for rotary movement on the base and means drivingly interconnecting the table assembly and the ring mount member, the second rotation means comprises second bearing means mounting the ring mount member for rotary movement relative to the table assembly, and the means drivingly interconnecting the table assembly and the ring mount member is operative when actuated to rotate the ring mount member relative to the table assembly. This arrangement facilitates the joint rotary movement of the table assembly and ring mount member between portrait and landscape formats and further facilitates the selective rotary movement of the film relative to the table assembly aperture to correct for out of level exposures.

BRIEF DESCRIPTION OF THE DRAWINGS

FIG. 3 is a front view of the film drive assembly;

FIG. 4 is an end view of the film drive assembly;

FIG. 6 is a somewhat schematic cross-sectional view of the film drive assembly; and FIG. 7 is a schematic view showing film movements achieved utilizing the invention film drive assembly.

DETAILED DESCRIPTION OF THE PREFERRED EMBODIMENT

Figure 1:
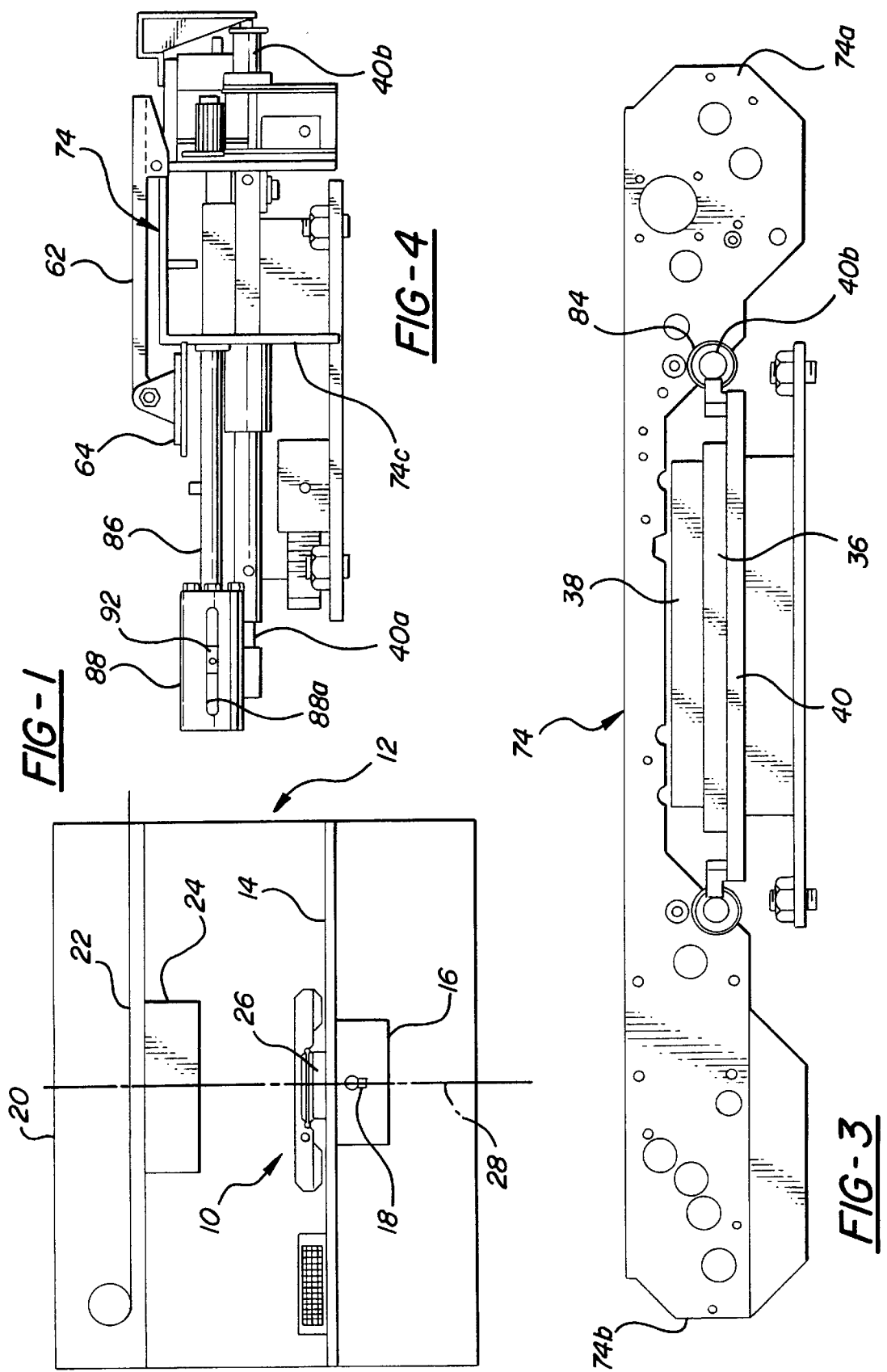
FIG. 1 is schematic view of a photographic printer employing a film drive assembly according to the invention.
Figure 2:
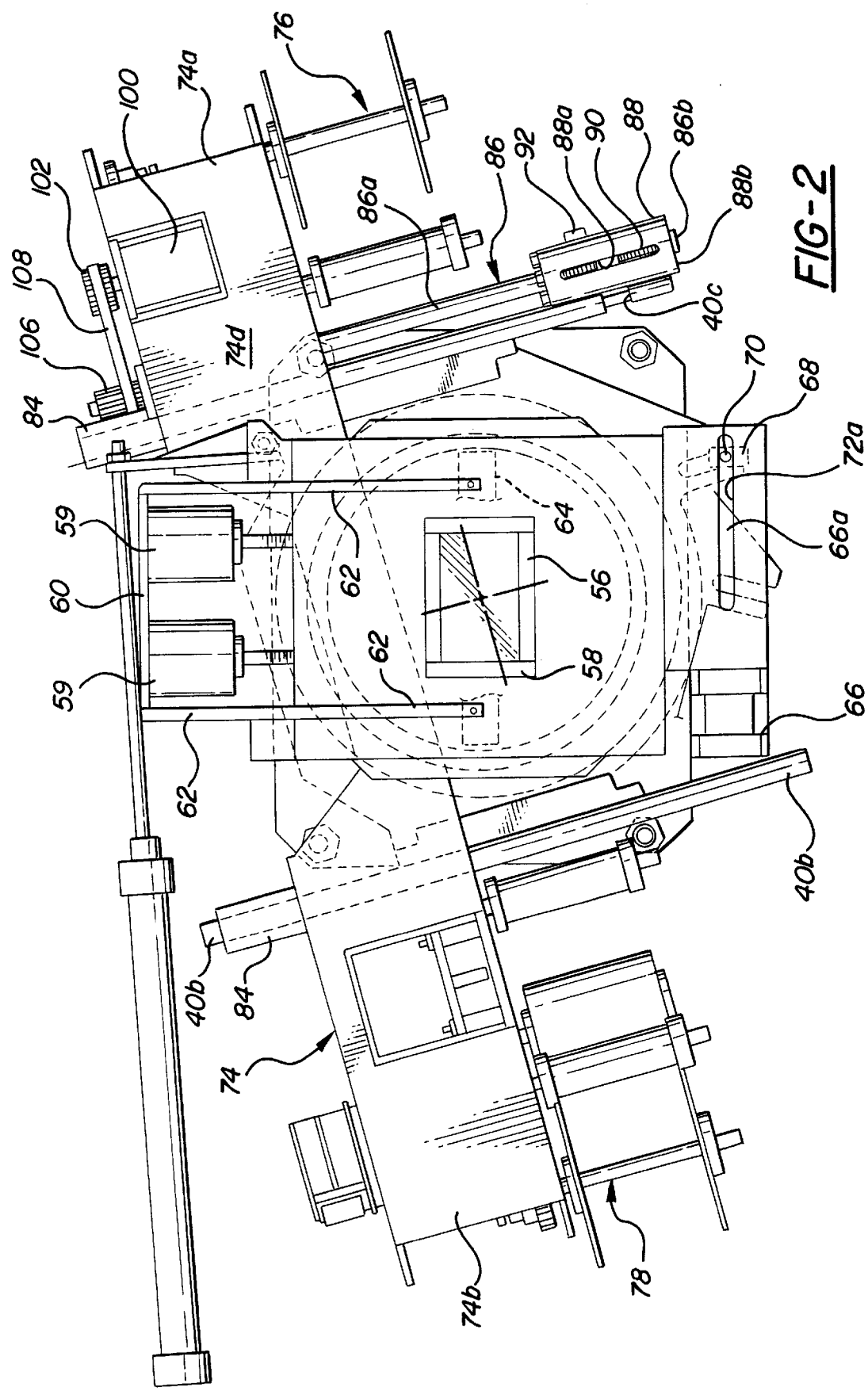
FIG. 2 is a plan view of the film drive assembly.
Figure 5:
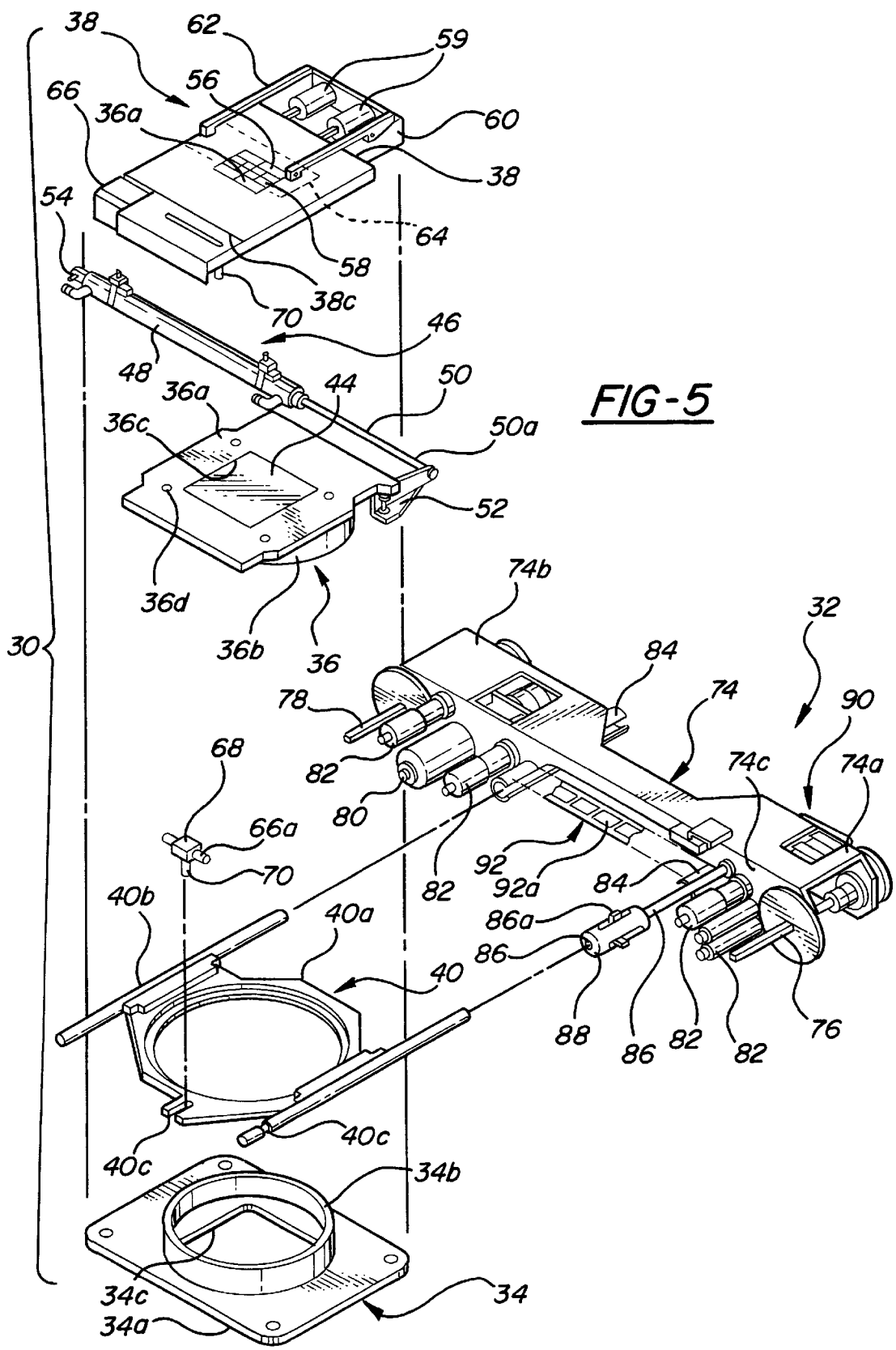
FIG. 5 is an exploded view of the film drive assembly.

The film drive assembly 10 of the invention is seen in FIG. 1 in association with a photographic printer 12.

Photographic printer 12 has a desk configuration and defines a work surface or counter 14 supporting the film drive assembly 10, a lamp house 16 positioned beneath the counter and including a light source 18, a compartment 20 positioned over the counter and housing a supply of photographic paper 22, and a lens deck 24 positioned beneath paper 22 and over film drive assembly 10.

Film drive assembly 10 is positioned on surface 14 at the optical stage 26 of the photographic printer in symmetric relation to the optical center line 28 of the photographic printer.

With reference to FIGS. 2–6, film drive assembly 10, broadly considered, includes a mount base assembly 30 and a film transport mechanism 32.

Mount base assembly 30 includes a base 34, a table assembly 35, and a ring mount member 40.

Base 34 includes a generally planar base portion 34a and a central annular pedestal portion 34b upstanding from plate portion 34a. Base portion 34 is fixedly secured to surface 14 in symmetric relation to center line 28 and defines a central aperture 34c positioned over an aperture 14a in surface 14 so as to allow light from light source 18 to pass upwardly through apertures 14a and 34c.

Table assembly 35 includes a table 36 and a riser block 38.

Table 36 includes a planar main body portion 36a and a downstanding annular ring portion 36b. Ring portion 36b is rotationally received within pedestal portion 34b of the base utilizing bearing means 42. A central aperture 36c is provided in planar portion 34a and a glass or plexiglass light-diffusing member 44 is positioned in aperture 36c. An air cylinder 46 controls rotary movement of table 36 about center line 28 between landscape and portrait positions. Air cylinder 46 includes a cylinder body 48, a piston rod 50, and a bracket 52 interconnecting the free end 50a of the piston rod to table 36. A bracket 54 on cylinder 48 allows the cylinder 46 to be fixedly secured to a suitable location on the photographic printer 12.

Riser block 38 has a generally planar configuration and defines a central aperture 38a. The size and configuration of aperture 38a is selectively controlled and varied by opposed transversely movable blades 56 and opposed longitudinally movable blades 58. Blades 56, 58 are controlled in known manner via, for example, stepper motors 59 positioned in a housing 60 secured to the rear face 38b of the riser block, and lever arms 62 are pivotally mounted on housing 60 to control a clamp 64 for holding a film frame positioned over aperture 38a in a flat disposition. Arms 62 and thereby clamp 64 may be controlled in known manner by air cylinders carried by housing 60. A stepper motor 66 is secured to the front face 38c of the riser block and includes a screw output shaft 66a threadably engaging a nut 68 carrying a pin 70 slidably guiding in a slot 72a of a guide plate 72 whereby actuation of stepper motor 66 rotates screw shaft 66a to move nut 68 and pin 70 linearly along slot 72a. Riser block 38 is positioned on top of table 36a and is held in position relative to table 36a via pins 38c received in corresponding holes 36d in table 36.

Ring mount member 40 includes a central ring portion 40a and parallel rail portions 40b positioned on opposite, diametrically opposed sides of ring portion 40a. Ring portion 40a is rotationally mounted beneath table main body portion 36a in surrounding relation to table ring portion 36b utilizing a bearing structure 74. A radially outwardly opening slot 40c in ring 40a receives the lower end of pin 70 so that the pin functions to move the ring mount member jointly with the table assembly between portrait and landscape formats but linear movement of pin 70 in guide slot 72a in response to actuation of stepper motor 66 has the effect of rotating ring mount member 40 relative to riser block 38 about optical center line 28. Initial and moved positions of ring mount member 40 relative to the riser block are shown in solid and dash lines respectively in FIG. 2. It will be seen that pin 70 moves radially in slot 40c as the ring mount member rotates relative to riser block 38.

Film transport mechanism 32 includes an elongated frame 74, a supply or feed spool 76 mounted on a feed end 74a of the frame, a take-up spool 78 mounted on a delivery end 74b of the frame, a suitably powered drive spool 80, guide spools 82, C-tubes 84, a selector shaft 86, a selector or index knob 88, and a vernier adjustment assembly 90. Film transport 32 is mounted on the ring mount member 40 by positioning C-tubes 84 slidably over respective rails 40b so that the film transport is free to move laterally or transversely with respect to the ring mount member. Spools 76–82 coact to define a longitudinal film feed path 90 extending from supply spool 76 to take-up spool 78 and passing over riser block aperture 38a proximate optical center line 28 so that film 92 from supply spool 76 may be selectively and incrementally moved along path 90 for take-up on spool 78 and individual film frames 92a (FIG. 7) may be incrementally and respectively moved into alignment with optical center line 28.

Selector shaft 86 has a circular cross-section and passes slidably through a journal aperture provided in the front wall 70c of frame 74 with a portion 86a extending in cantilever fashion from the front wall and terminating in a free end 86b.

Selector or index knob 88 has a generally circular configuration and is mounted for rotation on the cantilever portion 86a of selector shaft 86 proximate the free end 86b. Selector knob 88 is provided with four slots 88a extending parallel to the axis of shaft 86 and spaced equally circumferentially about the knob. A corresponding plurality of threaded shafts 90 have a slotted end positioned proximate the outboard face 88b of the selector knob to allow for manual rotation of the shafts. Tabs 92 are threadably mounted on respective threaded shafts 90 and extend radially outwardly through respective slots 88a. The tabs 92 are moved laterally along the central axis of selector shaft 86 by selective rotation of threaded shafts 90 utilizing the slotted shaft ends.

Vernier assembly 90 includes an electric stepper motor 100 mounted in the top wall 74b of the frame, a drive pulley 102 driven by a stepper motor output shaft 104, a driven pulley 106, and a drive belt 108 trained around pulleys 102 and 106 so that pulley 106 is rotated in response to energization of stepper motor 100. Pulley 106 includes a threaded internal bore (not shown) threadably receiving a threaded inboard end of selector shaft 86. Further details of selector assembly 86/88 and vernier adjustment assembly 90 are shown in assignee's U.S. Pat. No. 5,343,272.

Film transport mechanism 32 will be seen to be mounted on rails 40b for sliding movement relative to the ring mount member to selectively laterally position a frame 92a of the film 92 relative to aperture 38a in riser block 38. Specifically, tabs 92 of selector knob 88 are preset by selective adjustment of the associated shafts 90 to respectively correspond to a plurality of commonly encountered film width sizes such, for example, as 35 mm, 70 mm, etc. When processing a roll of film corresponding to a given film width, the operator simply moves the film drive assembly laterally on rails 40b to a position corresponding to the particular film width being processed and then rotates the selector knob 88 to position the tab 92 corresponding to the specific film width being processed in the detent 40c of the adjacent rail 40*b* to lock the film drive assembly relative to the mount base assembly. This gross adjustment of the film drive assembly relative to the mount base assembly prepares the mechanism for processing the roll of film having the width corresponding to the setting of the coacting interengaging tab 92 and detent 40*c*.

As each frame 92*a* of the film is positioned over the aperture 38*a* of the riser block, stepper motor 100 is selectively energized to provide a fine, lateral adjustment of the film relative to the aperture 38*a* corresponding to the specific cropping desired for that frame. The energization of the motor 100 and thereby the fine adjustment of the lateral position of the film drive assembly for each frame may be accomplished by a control panel under the control of the operator or may be accomplished by utilizing information stored in a database for each frame. Each frame of film may thus be selectively positioned relative to the aperture and relative to the optical center line along the Y axis, that is, the axis transverse to the path of movement of the film. Information stored in the database for each frame may also be utilized to selectively position each frame in the X direction relative to the aperture in the riser block, that is, the direction in which the film is moving; further stored information for each frame may be utilized to selectively actuate stepper motors 59 to selectively adjust blades 56 and 58 and thereby selectively adjust the cropping for each frame; and further stored information for each frame may be utilized to move the table assembly and film drive jointly between portrait and landscape formats.

Also, according to the invention, further information may be stored in the database for each frame with respect to any undesired tilting of the exposure of the frame caused, for example, by a camera that is not held in a level position at the time that the exposure is made. This tilt database information may be utilized according to the invention to selectively energize stepper motor 66 to selectively move pin 70 along slot 72*a* to selectively rotate the ring mount member and thereby the film transport mechanism relative to the riser block about the optical center line 38 (for example as between the solid line position of FIG. 2 and the dash line position of FIG. 2) to move the frame of film rotationally relative to the riser block aperture to correct for undesired tilting of the exposure of the frame.

This rotational movement of the frame 92*a* relative to the riser block aperture 38*a* is best seen in FIG. 7 wherein an initial tilted disposition of an image 110 in a frame 92*a* relative to riser block aperture 38*a* resulting from the camera not being level is shown in solid lines and the corrected or level disposition of the image relative to the riser block aperture 38*a* resulting from selective rotational movement of the ring mount member through an angle θ is seen in dash lines.

The invention will be seen to provide a film drive assembly in which the usual X and Y adjustments of each frame relative to the riser block aperture are retained and, in addition, provision is made to rotate each frame relative to the riser block aperture to correct for tilted images.

Whereas a preferred embodiment of the invention has been illustrated and described in detail, it will be apparent that various changes may be made in the disclosed embodiment without departing from the scope or spirit of the invention.

We claim:

1. A film drive assembly for use with photographic equipment of the type including an optical stage defining an optical center line, the assembly including a base defining a central aperture therein adapted to be positioned proximate the optical stage, a table assembly mounted on the base for rotary movement about the optical center line and including an aperture, and a film transport mechanism movable with the table assembly and defining a longitudinal film path passing over the table aperture, whereby the film transport mechanism may be rotated with the table assembly about the optical center line between portrait and landscape formats, characterized in that:

the film drive assembly further includes rotation means mounting the film transport mechanism for rotary movement relative to the table assembly about the optical center line, whereby the film transport mechanism may be rotated relative to the table assembly aperture to rotate the film relative to the table assembly aperture.

2. A film drive assembly for use with photographic equipment of the type including an optical stage defining an optical center line, the assembly including:

a base defining a central aperture adapted to be positioned proximate the optical stage;

a table assembly mounted on the base for rotary movement about the optical center line and including an aperture;

a film transport mechanism moveable with the table assembly and defining a longitudinal film path passing over the table aperture, whereby the film transport mechanism may be rotated with the table assembly about the optical center line between portrait and landscape formats; and rotation means mounting the film transport member for rotary movement relative to the table assembly about the optical center line, whereby the film transport mechanism may be rotated relative to the table assembly aperture to rotate the film relative to the table assembly aperture.

3. A film drive assembly for use with photographic equipment of the type including an optical stage defining an optical center line, the assembly including:

a base defining a central aperture adapted to be positioned proximate the optical stage;

a table assembly mounted on the base for rotary movement about the optical center line and defining an aperture;

a ring mount member including a central ring portion positioned concentric to the optical center line and parallel rails at opposite sides of the central ring portion;

a film transport mechanism mounted on the rails for transverse movement and defining a longitudinal film path passing over the table assembly aperture;

first rotation means mounting the ring mount member and the table assembly for joint rotary movement about the optical center line, whereby the film transport mechanism may be rotated with the table assembly about the optical center line between portrait and landscape formats; and second rotation means mounting the ring mount member for rotary movement relative to the table assembly about the optical center line, whereby the film may be rotated relative to the table assembly aperture.

4. A film drive assembly according to claim 3 wherein:

the first rotation means comprises first bearing means mounting the table assembly for rotary movement on the base and means drivingly interconnecting the table assembly to the ring mount member; and the second rotation means comprises second bearing means mounting the ring mount member for rotary movement relative to the table assembly.

5. A film drive assembly according to claim 4 wherein the means drivingly interconnecting the table assembly and the ring mount member is operative when actuated to rotate the ring mount member relative to the table assembly.

6. A film drive assembly according to claim 5 wherein the film drive assembly further includes format drive means operative to move the table assembly and thereby the ring mount member about the optical center line between portrait and landscape formats and further operative to preclude rotary movement of the table assembly relative to the base during rotation of the ring mount member relative to the table assembly.

7. A film drive assembly for use with photographic equipment of the type including an optical stage defining an optical center line, the assembly including a base defining central aperture therein adapted to be positioned proximate to the optical stage, a table assembly mounted on the base for rotary movement about the optical center line and including an aperture, and a film transport mechanism movable with the table assembly and defining a longitudinal film path passing over the table aperture, whereby the film transport mechanism may be rotated with the table assembly about the optical center line between portrait and landscape formats, characterized in that:

the film drive assembly further includes rotation means mounting the film transport mechanism for rotary movement relative to the table assembly about the optical center line, whereby the film transport mechanism may be rotated relative to the table assembly to rotate the film relative to the table assembly aperture, and the rotation means comprises a film transport mechanism mounting member having a central ring portion positioned concentric to the optical center line and parallel rails at opposite sides of the central ring portion; and the film transport mechanism is mounted on the rails for movement in a direction transverse to the longitudinal film path.

8. A film drive assembly according to claim 7 wherein:

the table assembly is positioned over the mounting member; and the film transport mechanism includes spaced guide members slidably positioned on the respective rails and includes a central bridge portion extending over the table assembly.

9. A film drive assembly according to claim 8 wherein the table assembly includes a table positioned over the mounting member and a riser block positioned over the table and defining the table assembly aperture.

10. A film drive assembly for use with photographic equipment of the type including an optical stage defining an optical center line, the assembly including:

a base defining a central aperture adapted to be positioned proximate the optical stage;

a table assembly mounted on the base for rotary movement about the optical center line and including an aperture;

a film transport mechanism moveable with the table assembly and defining a longitudinal film path passing over the table aperture, whereby the film transport mechanism may be rotated with the table assembly about the optical center line between portrait and landscape formats; and rotation means mounting the film transport member for rotary movement relative to the table assembly about the optical center line, whereby the film transport mechanism may be rotated relative to the table assembly aperture to rotate the film relative to the table assembly aperture; and the rotation means comprises a ring member mounted for rotation on the base about the optical center line and including parallel rails; and the film transport mechanism is mounted on the rails for movement in a direction transverse to the longitudinal film path.

\* \* \* \* \*